Patented Feb. 8, 1949

2,461,013

UNITED STATES PATENT OFFICE 2,461,013

ARYLMETHYLMERCAPTO ALDEHYDES

William Howells Vinton, Wilmington, Del., assignor to E. I. du Pont de Nemours & Company, Wilmington, Del., a corporation of Delaware No Drawing. Application August 23, 1944, Serial No. 550,857

4 Claims. (Cl. 260—609)

This invention relates to new organic sulfur-containing compounds and reactions thereof.

This invention has as an object the provision of new compounds of the formula:

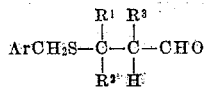

where Ar is an aryl or chlorinated aryl radical and $R^1$, $R^2$ and $R^3$ are hydrogen, alkyl, aryl or chlorine. A further object is the preparation of beta-(benzylmercapto)propionaldehyde. A still further object is the preparation of homocysteine and homologs from such compounds. Other objects will appear hereinafter.

These objects are accomplished by reacting a mercaptan of the formula $ArCH_2SH$ where Ar is selected from the group consisting of phenyl, alkylphenyl, chlorinated phenyl, naphthyl, alkylnaphthyl and chlorinated naphthyl radicals, with an alpha, beta-ethylenically unsaturated aldehyde. The aldehyde may have the formula $R^1R^2C=CR^3CHO$ where $R^1$, $R^2$ and $R^3$ may be hydrogen, aryl, alkyl or chlorine. It is preferred that at least one of the R groups be hydrogen. A second phase of this invention consists in the conversion of the above-mentioned compounds to the corresponding gamma-thiol-alpha-amino acids by reaction of the compounds with hydrogen cyanide and ammonia, followed by hydrolysis and reduction of the resulting material.

The more detailed practice of the invention is illustrated by the following examples wherein parts given are by weight. There are, of course, many forms of the invention other than these specific embodiments.

*Example I.*—Thirty-four parts of alpha-toluenethiol and 15.4 parts of acrolein (stabilized with hydroquinone) were placed in a still pot which had been chilled to −20° C. The temperature was allowed to rise slowly to 50° C., at which point the exothermic reaction was checked with a "Dry Ice"-acetone cooling bath. The temperature was maintained at 50° C. by occasional cooling until the reaction ceased to be exothermic. The still pot was warmed under a nitrogen atmosphere and the contents were subjected to a water-pump vacuum to remove volatile constituents. After these had been removed, the residue was distilled through a fractionating column, collecting the fraction which boiled from 96–98° C./0.3 mm. A small residue of polymer remained after the distillation. Thirty-five and four-tenths parts of product was obtained, corresponding to a yield of 72%. The product was a water-white liquid, which was soluble in the common organic solvents, but insoluble in water, and had a characteristic faintly unpleasant odor. Analysis calculated for $C_{10}H_{12}OS$: C, 66.6; H, 6.66; S, 17.8; found: C, 67.51; H, 7.16; S, 17.31.

$$\text{sp. g.} \frac{25°C.}{25°C.}, 1.1055$$

A 2,4-dinitrophenylhydrazone derivative was prepared (according to the method set forth in Lassar Cohn (1922) p. 47) from one part of the beta-(benzylmercapto)propionaldehyde, 0.75 part of 2,4-dinitrophenylhydrazine and 45 parts of 95% ethanol. A quantitative yield of product was obtained, which melted after recrystallization at 111–112° C. and which was deposited in golden yellow needles. Analysis calculated for $C_{16}H_{16}O_4N_4S$: N, 15.5; S, 8.9; found: N, 15.0; S, 8.6.

*Example II.*—When crotonaldehyde was substituted for the acrolein of the above example, beta-(benzylmercapto)butyraldehyde was obtained. It was a water-white liquid which boiled from 124–126° C./0.7 mm. Analysis: calculated for $C_{11}H_{14}OS$: C, 68.0; H, 7.22; S, 16.5; found: C, 68.44; H, 7.36; S, 16.45.

*Example III.*—The beta-(benzylmercapto)-propionaldehyde prepared in Example I above was treated with excess liquid hydrogen cyanide at 40° C. followed by reaction at 90–100° C. with liquid ammonia under pressure using 20 mols thereof per mol of cyanhydrin. The resulting aminonitrile was isolated and hydrolyzed at about 110° C. by treatment with 50% aqueous sulfuric acid to give the resulting amino acid, phenylmethionine. This can then be reduced by sodium in liquid ammonia to give homocysteine.

The preparation of the sulfide compounds from the alpha, beta unsaturated aldehyde and the aralkyl mercaptan may be carried out at temperatures of −50° C. to temperatures as high as 100° C. When temperatures of −50 to 0° C. are used, it is preferred that small amounts of such basic catalysts as pyridine be employed. For best results, temperatures of for example 0–50° C are preferred, in which case catalysts are unnecessary. Higher temperatures than 50° C. in general induce polymerization of the unsaturated aldehyde with corresponding decrease in yield of the sulfide.

Although this process is generally carried out in the absence of solvents or diluents, such solvents or diluents as cyclohexane, isooctane, diethyl ether, etc. can be used.

Examples of alpha, beta-unsaturated aldehydes that may be used in practice of this invention are acrolein, crotonaldehyde, 2-hexenal, alpha-propylacrolein, alpha-chlorocrotonaldehyde, cinnamaldehyde, etc.

In addition to alpha-toluenethiol (benylmercaptan), other mercaptans such as orthomethyl-alpha-toluenethiol, ortho- or para-chloro-alpha-toluene thiol, 1-naphthalenemethanethiol, 2-naphthalenemethanethiol, methyl-1-naphthalenemethanethiol, chloro-1-naphthalenemethanethiol may be employed. The thiol is preferably used in an amount such that approximately one mol is employed per mol of the unsaturated aldehyde.

In addition to providing a convenient method for preparing the beta-(benzylmercapto)propionaldehyde or analogs of the type previously defined, such compounds may be converted to the sulfur-containing amino acids as described in Example III. This reaction takes place in three stages, (1) conversion of the aldehyde to an alphaaminonitrile, (2) hydrolysis to the amino acid, and (3) removal of the $ArCH_2$— group attached to sulfur. While it is preferred that the first step be carried out by the use of liquid hydrogen cyanide at 40–50° C. followed by treatment with liquid ammonia at 25–125° C., equivalent methods which result in the formation of aminonitriles may be used. The hydrolysis of the nitrile to the acid may be brought out by the use of 30% to 50% aqueous mineral acids such as hydrochloric or sulfuric acids. The $ArCH_2$— radical can be removed by chemical reduction of the thioether such as with sodium in liquid ammonia.

The beta-(benzylmercapto)propionaldehyde and equivalent compounds can be converted to homocysteine and other related products. These compounds can be used in the synthesis of other chemical products. Compounds such as homocysteine may be employed as dietary supplements as a reducing agent for softening proteinaceous materials, particularly keratinous materials such as hair or wool, especially in connection with shrinkproofing, curling, and dekinking the same, or in the production of materials for dietary requirements, particularly where sulfur compounds are needed.

The above description and examples are intended to be illustrative only. Any modification thereof or variation therefrom which conforms to the spirit of the invention is intended to be included within the scope of the claims.

What is claimed is:
1. Beta-(benzylmercapto)propionaldehyde.
2. Beta-(benzylmercapto)butyraldehyde.
3. An aldehyde having, on the carbon beta to the aldehyde carbon, an arylmethylthio group $ArCH_2S$· wherein Ar is an aryl radical, the molecule, apart from the aryl radical, the one oxygen, and the one sulfur, being saturated aliphatic hydrocarbon.
4. Process which comprises reacting an arylmethyl mercaptan, $ArCH_2SH$ wherein Ar is an aryl group, and an alpha, beta-ethylenically unsaturated aldehyde which is, apart from the aldehyde oxygen and the alpha, beta ethylenic linkage, saturated aliphatic hydrocarbon and isolating the beta $ArCH_2S$— substituted aldehyde.

WILLIAM HOWELLS VINTON.

REFERENCES CITED

The following references are of record in the file of this patent:

UNITED STATES PATENTS

| Number | Name | Date |
|---|---|---|
| 2,051,807 | Allen | Aug. 25, 1936 |

FOREIGN PATENTS

| Number | Country | Date |
|---|---|---|
| 845,793 | France | Sept. 1, 1939 |

OTHER REFERENCES

Patterson et al., "Jour. Biol. Chem.," vol. 111, pages 393–398 (1935).

Herbst, "Jour. Am. Chem. Soc.," vol. 58, pages 2239 to 2243 (1936).

Fromm, "Ber. Deut. Chem. Gas.," vol. 56, pages 2290 to 2294 (1923).

Barger et al., "Bichem J.," vol. 22 (1928), pages 1420–1421.

Rothstein, "J. Chem. Soc." (London) 1940, page 1562.

Kaneko et al., "Chemical Abstracts," vol. 33 (1939), page 2106.

Certificate of Correction

Patent No. 2,461,013. February 8, 1949.

WILLIAM HOWELLS VINTON

It is hereby certified that errors appear in the printed specification of the above numbered patent requiring correction as follows:

Column 3, lines 5 and 6, for "(benylmercaptan)" read *(benzylmercaptan)*; column 4, line 16, claim 4, for the words "and an" read *with an*;

and that the said Letters Patent should be read with these corrections therein that the same may conform to the record of the case in the Patent Office.

Signed and sealed this 21st day of June, A. D. 1949.

[SEAL]

THOMAS F. MURPHY,
*Assistant Commissioner of Patents.*